United States Patent
Tripier et al.

(10) Patent No.: US 12,541,702 B2
(45) Date of Patent: Feb. 3, 2026

(54) MAXIMIZING CIRCUIT EXECUTION DUTY CYCLE BY STREAMING GATES

(71) Applicant: IonQ, Inc., College Park, MD (US)

(72) Inventors: Felix Tripier, Washington, DC (US); Redeat Alemu, Fairfax, VA (US); Joel Zvi Apisdorf, Reston, VA (US); Vandiver Chaplin, New York, NY (US); Steven Friedman, Silver Spring, MD (US); Carl Henning, College Park, MD (US); Mike Williams, Annapolis, MD (US)

(73) Assignee: IonQ, Inc., College Park, MD (US)

(*) Notice: Subject to any disclaimer, the term of this patent is extended or adjusted under 35 U.S.C. 154(b) by 40 days.

(21) Appl. No.: 18/770,347

(22) Filed: Jul. 11, 2024

(65) Prior Publication Data

US 2025/0021859 A1    Jan. 16, 2025

Related U.S. Application Data

(60) Provisional application No. 63/513,446, filed on Jul. 13, 2023.

(51) Int. Cl.
*G06N 10/70* (2022.01)
*G06N 10/20* (2022.01)

(52) U.S. Cl.
CPC .............. *G06N 10/70* (2022.01); *G06N 10/20* (2022.01)

(58) Field of Classification Search
CPC ......... G06N 10/20; G06N 10/40; G06N 10/70
See application file for complete search history.

(56) References Cited

U.S. PATENT DOCUMENTS

| | | | | |
|---|---|---|---|---|
| 2018/0336015 | A1* | 11/2018 | Roetteler | G06F 7/72 |
| 2023/0160747 | A1* | 5/2023 | Wang | G06N 10/20 |
| | | | | 702/189 |
| 2023/0244974 | A1* | 8/2023 | Fang | G06N 10/20 |
| | | | | 706/14 |
| 2024/0394585 | A1* | 11/2024 | Reagor | G06N 10/40 |

* cited by examiner

*Primary Examiner* — Shelly A Chase
(74) *Attorney, Agent, or Firm* — ARENTFOX SCHIFF LLP

(57) ABSTRACT

Systems and methods are described for use in the implementation and/or operation of quantum information processing (QIP) systems, and more particularly, to implementation of streaming gates.

18 Claims, 8 Drawing Sheets

MAXIMIZING CIRCUIT EXECUTION DUTY CYCLE BY STREAMING GATES

CROSS-REFERENCE TO RELATED APPLICATIONS

This application claims the benefit of U.S. Provisional Application No. 63/513,446, filed Jul. 13, 2023, which is herein incorporated by reference.

TECHNICAL FIELD

Aspects of the present disclosure relate generally to systems and methods for use in the implementation, operation, and/or use of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

QIP systems execute circuits. The process for running a circuit involves (1) fetching a high level description of the circuit from a customer-facing job queue, (2) calibrating the system to execute the job queue, (3) translating the fetched description of the circuit into a form amenable to be executed on the specific trapped ion system that will be executing it, (4) translating the circuit into Field Programmable Gate Array (FPGA)-executable programs for the various real-time peripherals involved in executing the circuit, and lastly, and (5) running the circuit.

In the naive approach, these steps occur sequentially and block the execution of enqueued customer jobs. As a consequence, QIP systems executing circuits in a naive manner spend the vast majority of their time in steps 1-4, and by doing so, greatly reduce their availability to execute other circuits.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of systems and methods for use in the implementation and/or operation of quantum information processing (QIP) systems, and more particularly, to implementation of maximizing circuit execution duty cycle by streaming gates.

In some aspects, the techniques described herein relate to a quantum information processing (QIP) system including: a circuit executor configured to execute pulses that represent quantum gates or quantum circuits; an error correction circuit that outputs ancilla readouts of executed pulses; a classical control processor configured to: identify a first logic gate of a quantum circuit, wherein the first logic gate includes a first pulse and a second pulse; upload, for execution to the circuit executor, the first pulse of the first logic gate; receive, from the error correction circuit, a first ancilla readout associated with the execution of the first pulse, wherein the first ancilla readout indicates an error of the first pulse; compute and upload for execution to the circuit executor, based on the first ancilla readout, a first corrected pulse of a corrected quantum circuit associated with the quantum circuit; concurrent to computing and uploading the first corrected pulse, upload the second pulse for execution to the circuit executor; receive, from the error correction circuit, a second ancilla readout indicating an error of the second pulse; and compute and upload for execution to the circuit executor, based on the second ancilla readout, a second corrected pulse of the corrected quantum circuit.

In some aspects, the techniques described herein relate to a quantum information processing (QIP) system including: a circuit executor configured to execute pulses that represent quantum gates or quantum circuits; an error correction circuit that outputs ancilla readouts of executed pulses; a classical control processor configured to: generate and upload to the circuit executor a plurality of precompiled quantum circuit branches, wherein each branch of the plurality of precompiled quantum circuit branches represents a variation of a quantum circuit; select a first branch of the plurality of precompiled quantum circuit branches to execute; receive, from the error correction circuit, a first ancilla readout associated with the execution of a first pulse of the first branch, wherein the first ancilla readout indicates an error of the first pulse; select a second branch of the plurality of precompiled quantum circuit to execute based on the first ancilla readout; receive, from the error correction circuit, a second ancilla readout associated with the execution of a second pulse of the second branch, wherein the second ancilla readout indicates an error of the second pulse; and select a third branch of the plurality of precompiled quantum circuit to execute based on the second ancilla readout.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

In order to address the shortcomings of the naïve approach described in the Background section, the present disclosure describes systems and methods for streaming circuits. A QIP system may, by streaming circuits, always be executing some circuit while other circuits are downloaded, compiled, and calibrated on the fly and in parallel.

Streaming is a "pipelining" approach where each step of a circuit execution can be executed simultaneously, with a different circuit proceeding through each step. The streaming pipeline can be arbitrarily fine-grained, but, it is alternatively possible to pipeline at the level of entire circuits (e.g., an entire circuit proceeds through the pipeline rather than individual gates (as in streaming). The downside of this approach is that, in algorithms where the compilation of a circuit depends on the results of a previous circuit, one must wait for the previous circuit to clear the entire pipeline-experiencing the same gaps characterized earlier for a set of circuits (the pipelining scheduler can, however, schedule unrelated, interleaving circuits). An additional drawback is that, because compiling an entire circuit takes a considerable amount of time, the total time between: calibrating a circuit, and compiling it with those parameters, and finally running it, is much longer than in the streaming approach-meaning circuits are, on average, not fully calibrated.

Accordingly, a pipelined approach to quantum circuit execution at the granularity of individual gates is described herein.

Solutions to the issues described above are explained in more detail in connection with FIGS. 1-7, with FIGS. 1-3 providing exemplary QIP systems or quantum computers, and more specifically, atomic-based QIP systems or quantum computers.

Figure 1:
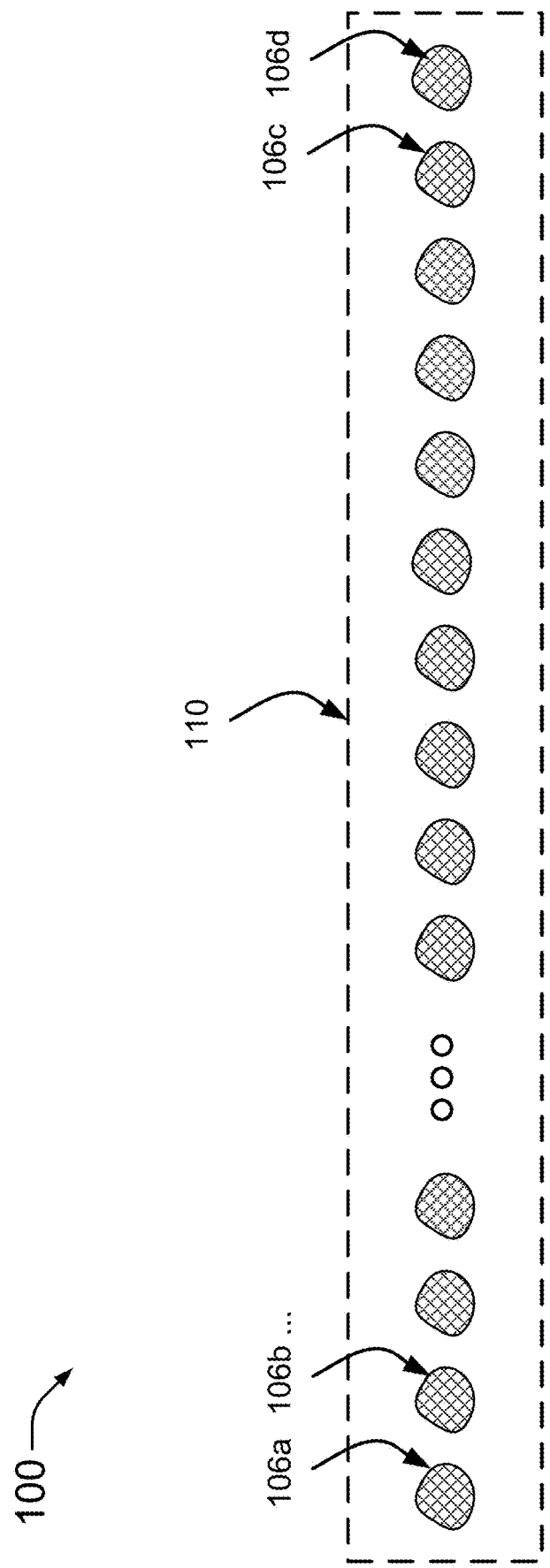
FIG. 1 illustrates a view of atomic ions a linear crystal or chain in accordance with aspects of this disclosure.
Figure 2:
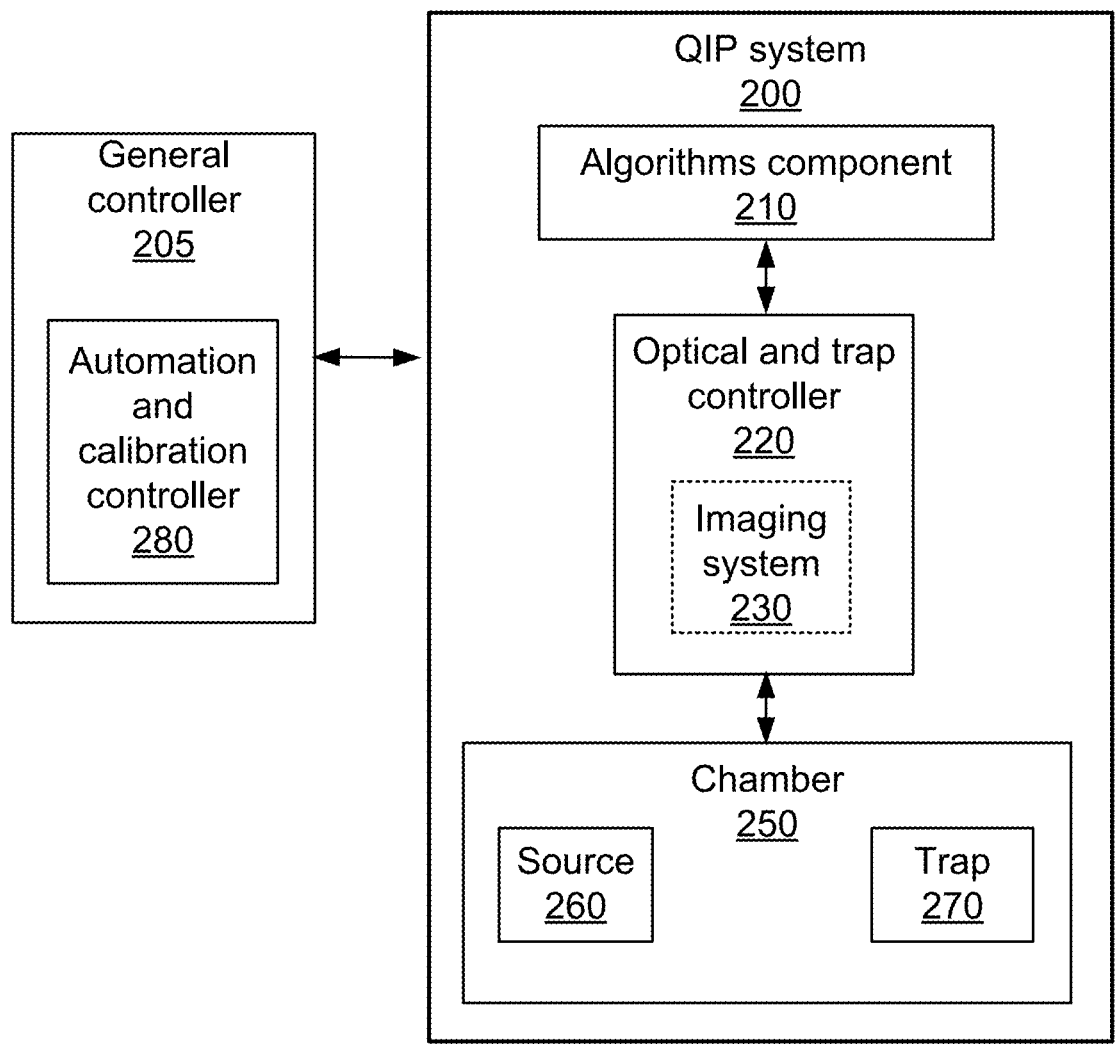
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap maybe referred to as an ion trap. The ion trap shown may be built or fabricated on a semiconductor substrate, a dielectric substrate, or a glass die or wafer (also referred to as a glass substrate). The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions can be Ytterbium ions (e.g., $^{171}Yb^+$ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to Ytterbium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals to control the trap 270. The optical and trap controller 220 may also control the operation of lasers, optical systems, and optical components that are used to provide the optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the QIP system 200 with the optical elements of a beam shaping structure as arranged therein.

Figure 3:
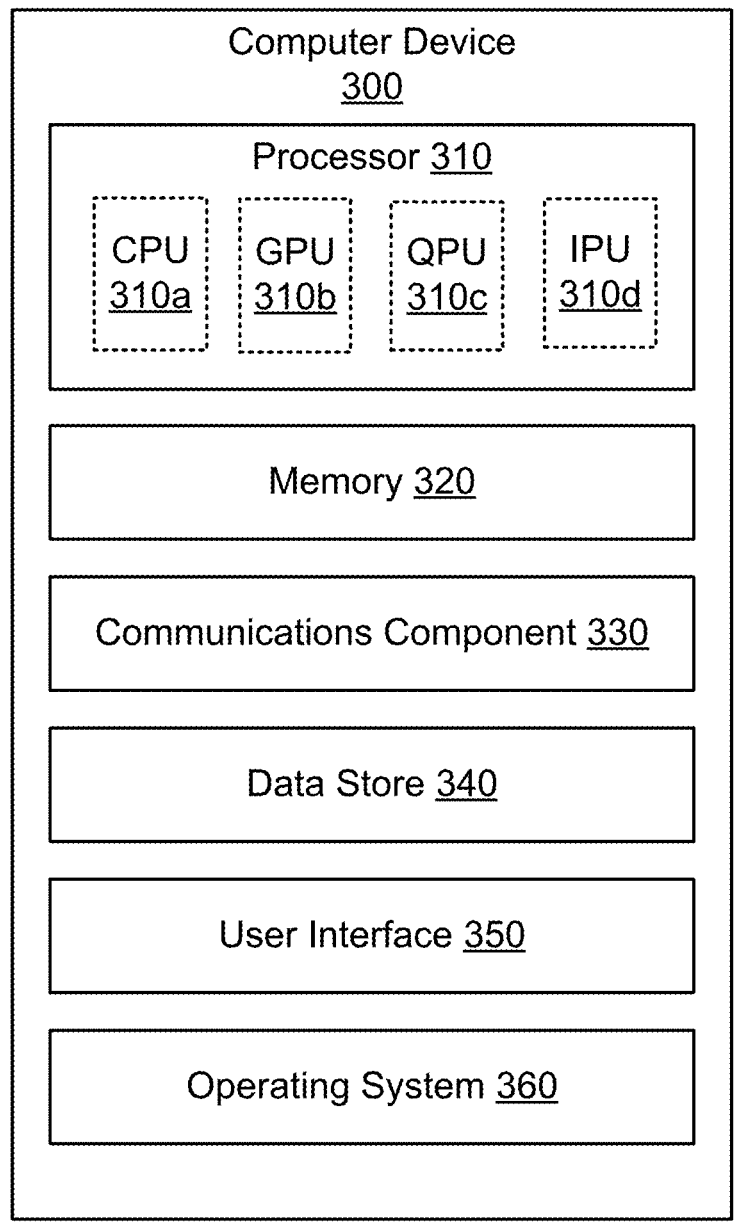
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310a, one or more graphics processing units (GPUs) 310b, one or more quantum processing units (QPUs) 310c, one or more intelligence processing units (IPUs) 310d (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310c. Some or all of the QPUs 310c may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, in one or more implementations, the QIP systems as disclosed herein include structures inserted into the QIP system that improve the efficiency of trapping ions relative to conventional trapping structures.

Figure 4:
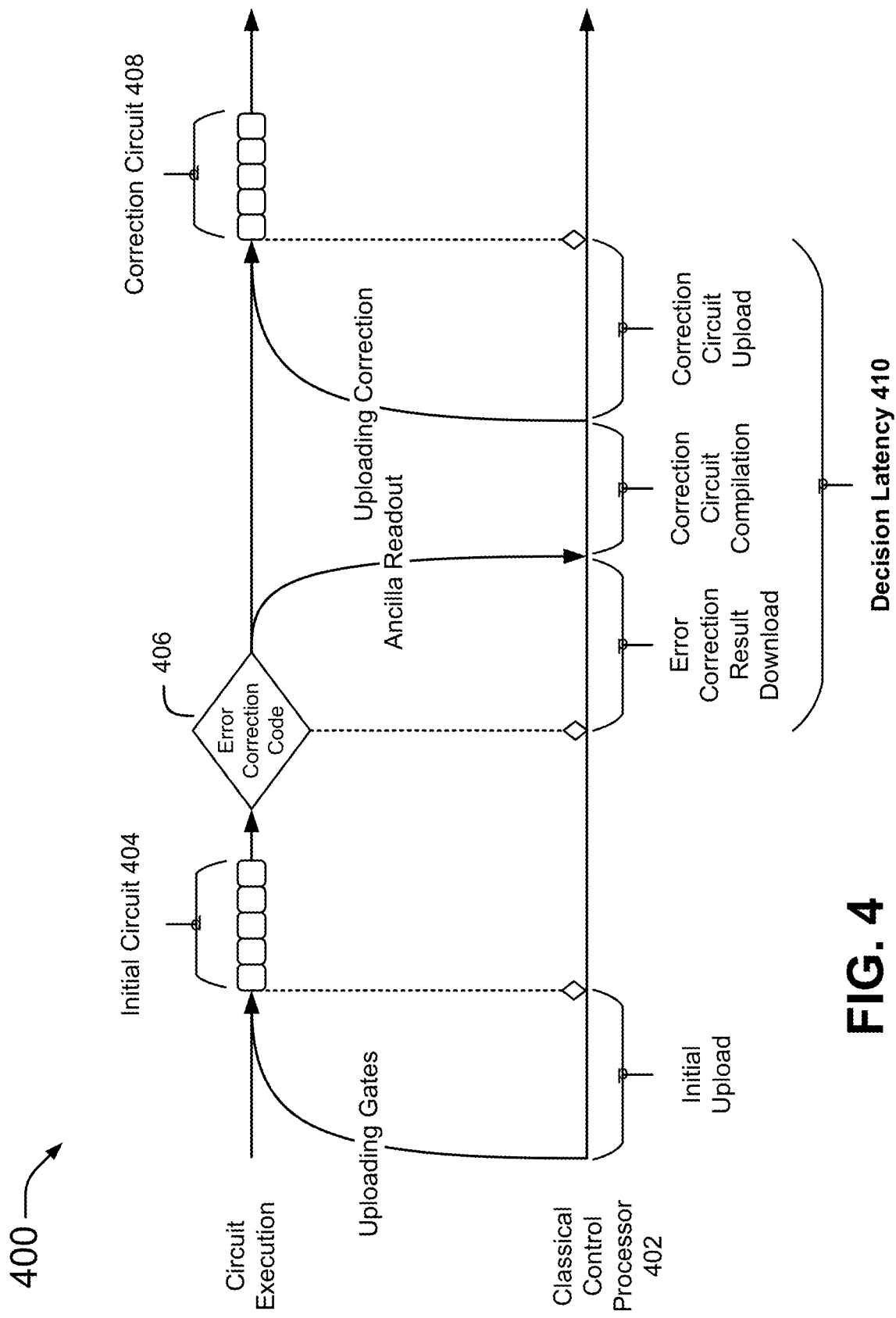
FIG. 4 illustrates an example for executing a circuit using a naive synchronous compilation model.

FIG. 4 illustrates an example 400 for executing a circuit using a naive synchronous compilation model. The circuit in example 400 may be executed by processor 310 in FIG. 3 (e.g., CPU 310a). In the present disclosure, a circuit is a linear subsequence of gates in a quantum algorithm and does not require feedback from a classical control processor. A pulse is a data packet that describes a single atomic physical operation on a set of qubits.

In the naive synchronous compilation model, latency is maximized. The classical control component of the system (i.e., classical control processor 402) uploads, from a quantum compiler to a quantum control system, an initial circuit 404 composed of at least one logical gate. For example, classical control processor 402 may be processor 310 of computer device 300. Each logical gate is composed of multiple independent pulses, which are atomic and independent components of a gate. In the synchronous quantum compiler model, the compiler runs machines that do not need to be real-time, even though the quantum control system is real-time. Here, some of the backend quantum compilation is moved to the quantum control system to run in real-time. The uploaded circuit undergoes an error correction via error correction code 406, which determines whether the output of each gate is accurate. In particular, error correction code 406 outputs an ancilla readout, which is an error result that is downloaded to classical control processor 402. Classical control processor 402 then waits to have finished downloading the ancilla result to compile and upload the entire error correction circuit 408. In the naïve synchronous compilation model, the decision latency is high because it includes error correction result downloading, full correction circuit compilation, and the uploading of the entire correction circuit 408.

Figure 5:
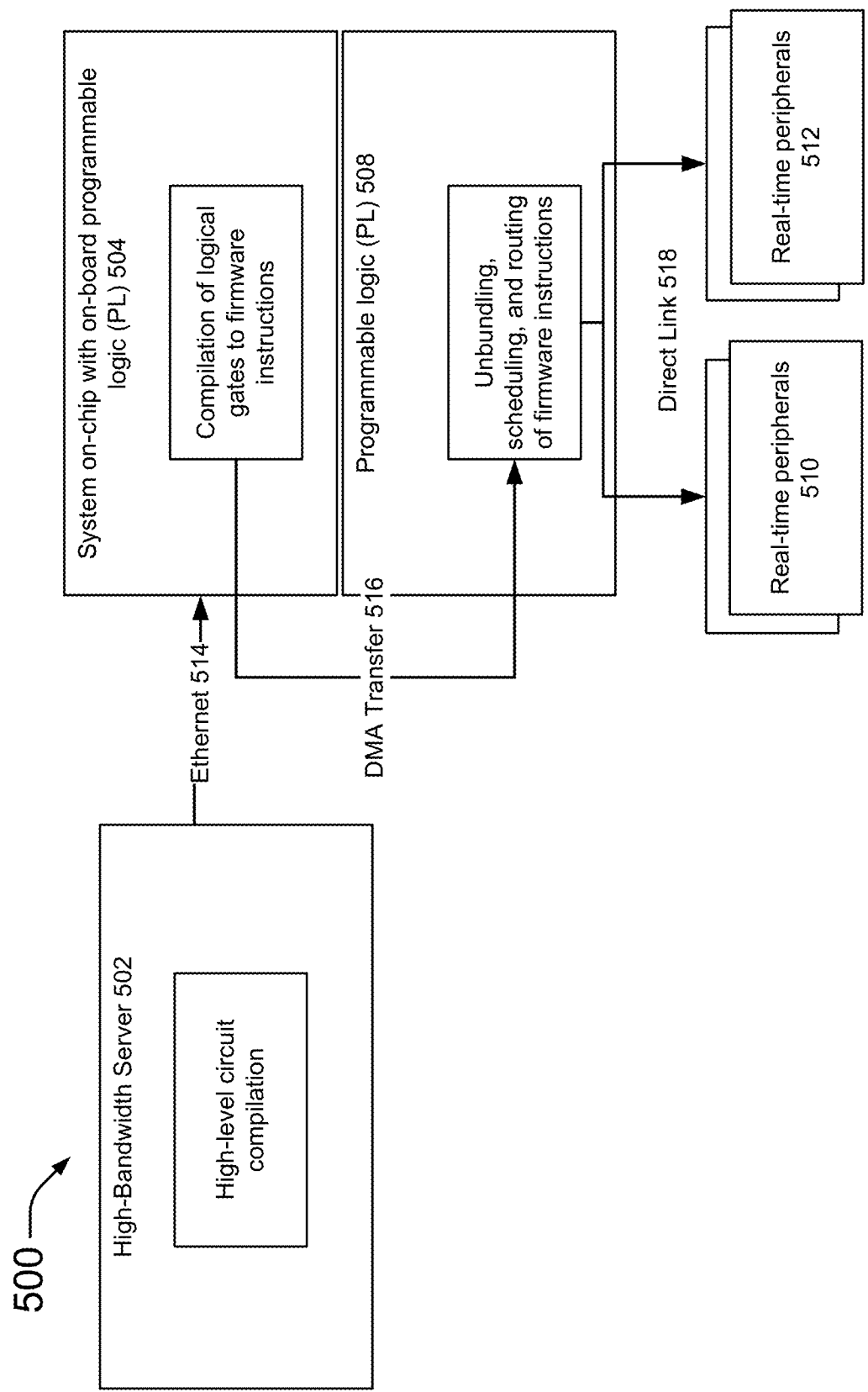
FIG. 5 illustrates an exemplary system for streaming gates in accordance with aspects of this disclosure.

FIG. 5 illustrates an exemplary system 500 for streaming gates in accordance with aspects of this disclosure. A customer-submitted circuit includes high-level quantum operations ("gates") to perform on selected qubits. These operations must ultimately be synthesized into a "program" of firmware instructions—a sequence of time-tagged binary packets that instruct a real-time peripheral to perform an operation. Prior to running a quantum application, quantum circuits undergo pre-processing in which signals are generated and sent out to ions to cause quantum computations. This pre-processing takes a non-trivial amount of time to be executed. Accordingly, when a user provides a quantum application, the conventional approach is to perform the pre-processing for the entire quantum application and subsequently execute the application.

Pre-processing further includes calibrating the gates in the quantum circuits. For example, the IonQ platform has native gates such as GPi rotation gates (which are gates set to rotate through an angle of π radians) and GPi2 rotation gates (which are gates set to rotate through an angle of π/2 radians). A calibration procedure may involve running the rotational gate in a calibration circuit to determine an error between an expected output value and an actual output value, and subsequently correcting/reducing the error. Such errors may arise from a drift of analog parameters (e.g., power level). Thus, a circuit (e.g., error correction code 406) is run specifically to measure the state of the system, determine a drift and correct future circuits.

In an exemplary aspect of the present disclosure, a pipeline is provided comprising compilers that are each instrumented to process and compile programs one gate at a time. In example 400, high-bandwidth server 502 (e.g., computer device 300) performs a high-level circuit compilation. For example, the high-level circuit compilation may involve performing a part of the compilation that will not change later. One aspect of the systems and methods of present disclosure is that time sensitive parameters can be determined very close to when the circuit is run, and other parameters that are not time dependent may be preprocessed early.

The outputs of each compiler are fed into the inputs of another in such a way that allows the entire pipeline to proceed simultaneously. This entire pipeline of compilers can reference state related to calibration parameters (e.g., the frequency of a given tone for a certain laser used as part of a single-qubit gate on a trapped ion quantum computer) and dynamic mapping and registration of constrained resources (e.g. a single laser that must be used for any gate on a trapped-ion quantum computer, but cannot be used by any two gates at the same time as it can only address a single ion at a time).

In some aspects, the architecture of the present disclosure features a last leg of circuit compilation occurring on a system on a chip (SoC) with both the general CPU and a programmable logic plane capable of routing time-tagged firmware instructions to remote or local FPGA or other hardware. For example, high-bandwidth server 502 is connected to SoC with on-board programmable logic (PL) 504, which is configured to compile logical gates into firmware instructions.

This architecture allows one to separate high-bandwidth (but latency indifferent) phases of the circuit compilation cycle (e.g., optimizing the reservation of constrained resources such as laser beams) on server-scale hardware, while ensuring that the highest priority but lowest bandwidth phases of the circuit compilation cycle (translating to firmware instructions) enjoy the low latency afforded via locality with the firmware peripherals responsible for executing the actual radiofrequency and digital signals involved in circuit execution.

Unbundling, scheduling of phase, and routing of firmware instructions is performed in the SoC's onboard PL 508 in order to centralize scheduling of time tagged instructions over an arbitrary fan-out of real-time peripherals 510 and 512 (e.g., an arbitrary waveform generator (AWG), Digital Direct Synthesis (DDS), transistor—transistor logic (TTL)). This allows for scalable distributed control. In some aspects, information is transferred to PL 508 from SoC with on-board PL 504 using direct memory access (DMA) (i.e., DMA transfer 516). Real-time peripherals 510 and 512 receive information from PL 508 via a direct link 518, which is over a bus such as an aurora bus. It should be noted that the tasks described above can be done on one PL (e.g., PL 508). It is an architecture decision to perform the tasks on at least two, so one PL on one card can control a number of PLs on other cards.

Figure 6:
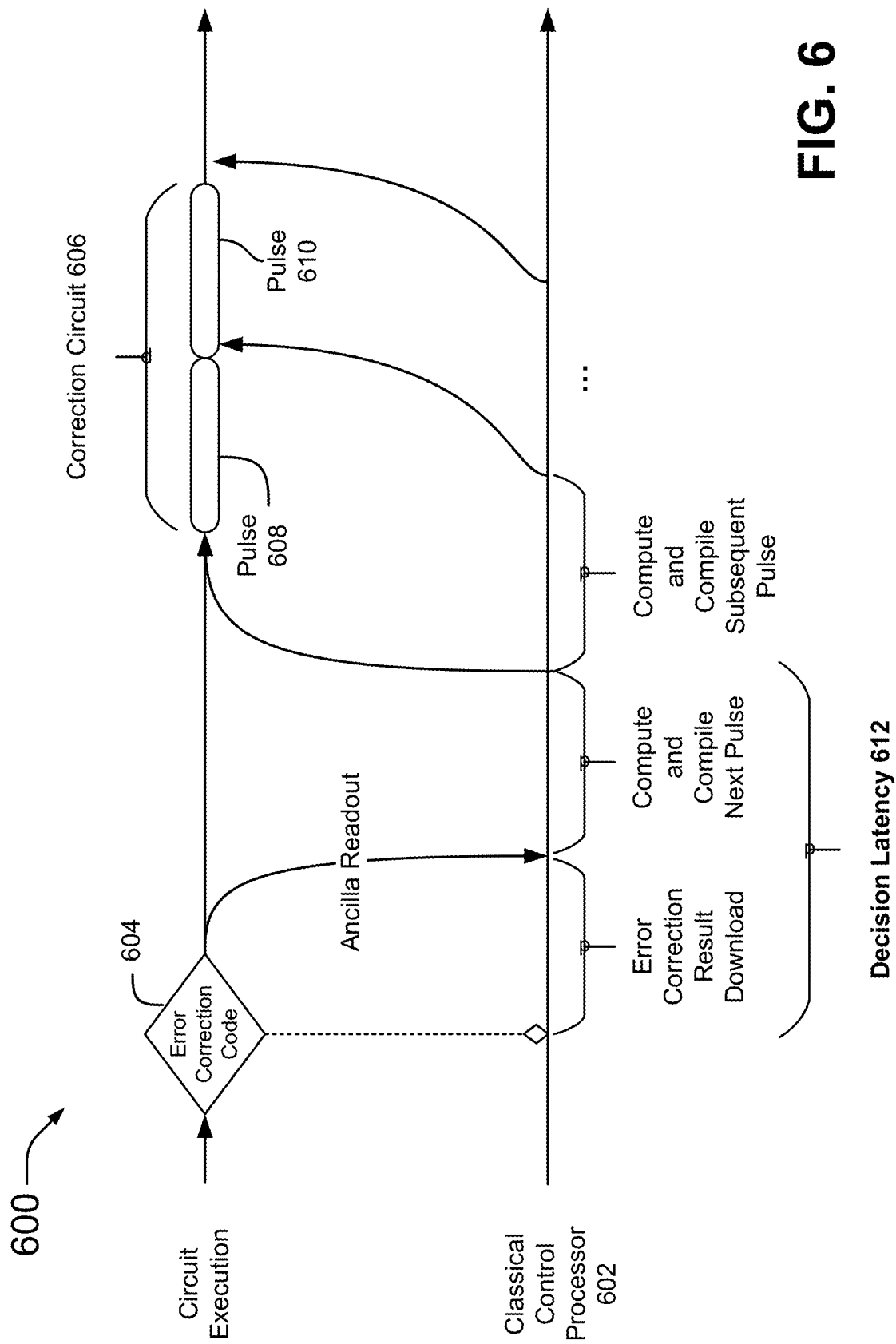
FIG. 6 illustrates an example for streaming gates in accordance with aspects of this disclosure.

FIG. 6 illustrates an example 600 for streaming gates in accordance with aspects of this disclosure. During streaming compilation and upload, classical control processor 602 uploads and executes pulses at an arbitrary granularity. For example, classical control processor 602 (e.g., processor 310 of computer device 300) may schedule one or more pulses of a circuit to execute at some point in the future, and compile subsequent pulses as the one or more pulses are executing.

In other words, classical control processor 602 may pipeline the compilation and upload of circuit pulses as the circuit is executed. This means that the decision latency 612 is determined by the compilation and upload time of a single pulse rather than an entire circuit.

Referring to FIG. 6, classical control processor 602 may upload pulse 608, which undergoes error correction via error correction code 604. Classical control processor 602 downloads an ancilla readout from error correction code 604 and computes the correction pulse. While the correction is computed, classical control processor 602 may upload pulse 610, which undergoes error correction via error correction code 604. Classical control processor 602 downloads the next ancilla readout and computes the correction pulse. This process is repeated until the entire correction circuit 606 is uploaded. In some aspects, there may be multiple ancilla readouts throughout a program. This may involve reusing the same ancilla, or using multiple ancillary readouts.

In terms of corrections, a correct ancilla readout typically indicates that no errors have been detected in the corresponding data qubits. The specific readout values that indicate a "correct" state can depend on the error correction code being used and the way ancilla qubits are measured. The correction pulses are calculated such that when the correction pulses are applied, the correct ancilla readout is output.

In many error correction schemes, such as the surface code or the Shor code, the correct readout values are often designed to be '00' for pairs of ancilla qubits. This indicates that no bit-flip or phase-flip errors have been detected.

The exact interpretation of the ancilla readouts can vary depending on the error correction code in use. For example: (1) surface code uses a lattice of physical qubits and ancilla qubits to detect and correct errors—here, '00' (or simply a parity of 0) would indicate no detected error; (2) Shor code uses nine qubits to encode a single logical qubit and multiple ancilla qubits to detect errors; the readout patterns can vary, but generally a pattern indicating no errors (like all '00's) is expected; and (3) Steane Code uses seven qubits to encode a single logical qubit with specific patterns for ancilla readouts indicating error-free states.

When calculating the correction pulse, results are read out and, depending on the actual code, a specific set of pulses are applied for corrections.

Consider an example where the bit string 10 01 10 is read out from the ancilla ions. Given the readout sequence '10 01 10', the system determines the necessary correction pulses:
1. 10: The first ancilla ion pair is '10'. This may indicate a bit-flip error (X-error) on the first qubit.
2. 01: The second ancilla ion pair is '01'. This may indicate a bit-flip error on the second qubit.
3. 10: The third ancilla ion pair is '10'. This may again indicate a bit-flip error on the third qubit.

Assuming these readouts map directly to bit-flip errors on their corresponding qubits, the correction pulse may involve applying a standard Pi rotation pulse to the primary computation ions. Accordingly, the following correction pulses may be applied:
1. Apply an X-gate to the first qubit to correct the error indicated by '10'.
2. Apply an X-gate to the second qubit to correct the error indicated by '01'.
3. Apply an X-gate to the third qubit to correct the error indicated by '10'.

In quantum circuit notation, these corrections would be:
1. $X_1$
2. $X_2$
3. $X_3$ The correction pulse sequence is thus $[X_1, X_2, X_3]$, which should correct the bit-flip errors indicated by the readout '10 01 10'.

In another example, if the bit string 11 11 11 is read out from the ancilla ions, the correction pulse may involve applying a half-pi rotation pulse with a phase advance followed by a Pi rotation pulse.

In terms of time-tagged instructions, the present disclosure introduces a paradigm of firmware program execution whereby firmware peripherals read time-tagged instructions from a first-in-first out (FIFO) queue, and execute the instructions when their internal, synchronized time bases match the timestamp.

Programming an AWG in this manner is difficult in the typical paradigm—streaming samples at the resolution required to modulate laser tones at the rates necessary to implement native trapped ion gates is too bandwidth intensive to be efficient for streaming gates.

Thus, a hybrid AWG is introduced that is capable of mixing both tones produced by statically programmed DDS and AWG IQ samples that specify tones as quadrature signals. Upon initialization of the system, a bank of IQ samples is uploaded that includes all signal waveforms used by gates at runtime. The gates are executed by uploading time-tagged instructions that specify: (1) a range of pre-uploaded IQ samples to execute, (2) the base frequency of each DDS mixed with the upsampled IQ samples, (3) gain multipliers for the amplitude of the waveform, (4) starting phase for each DDS, and (5) various other space-efficient parameters that are mixed with the pre-uploaded AWG samples on instruction execution.

This method of programing the AWG allows one to specify all the parameters necessary to implement an arbitrarily high resolution tone in a compact instruction—granting the system of the present disclosure the ability to program an AWG in a real-time streaming manner by bundling together a range of pre-uploaded samples alongside the parameters of a waveform most susceptible to changing on a per-gate basis (and through calibration).

Figure 7:
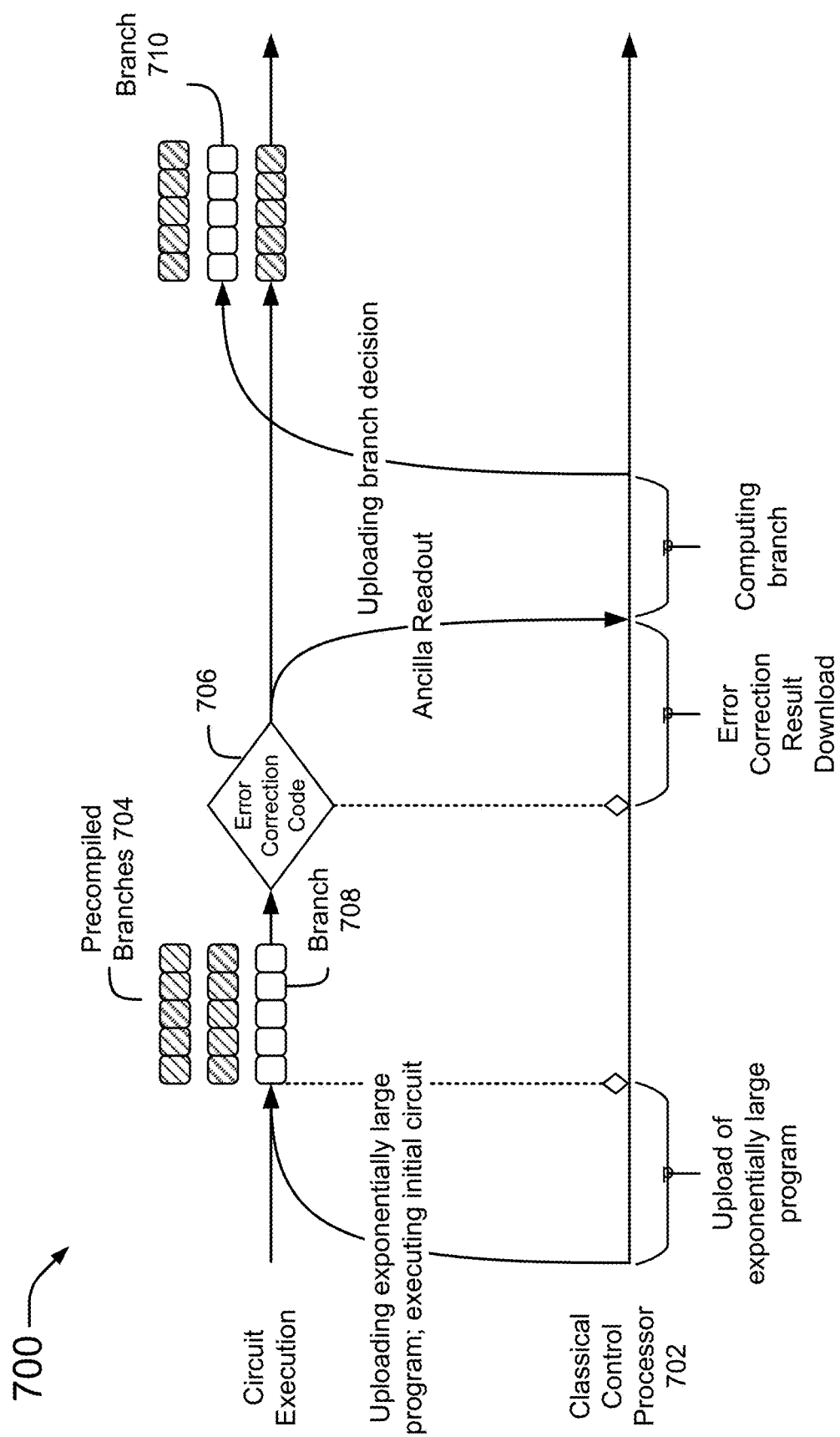
FIG. 7 illustrates an example for precompiled branching in accordance with aspects of this disclosure.

FIG. 7 illustrates an example 700 for precompiled branching in accordance with aspects of this disclosure. In precompiled branching, all possible branches 704 are uploaded by classical control processor 702. Each branch represents a variation of a particular circuit. The differences in each variation include conditional logic specifying the next gate to execute, including gates for quantum error correction. The initial execution involves the execution of one branch 708 of branches 704. The circuit undergoes error correction via error correction code 706, which outputs an ancilla readout. Classical control processor 702 downloads the result and sends a packet indicating which branch to execute in response to the ancilla readout payload. For example, the ancilla readout may indicate an error such as a bit flip error or a phase flip error, and in order to minimize the error, classical control processor 702 may select branch 710 of branches 704. The error may be corrected specifically by conditionally executing a branch with quantum Pauli gates or other quantum gates. By precompiling branches, the decision latency only involves computing a branch, and uploading a single branch selection packet to the circuit execution subsystem. In some aspects, instead of a single branch selection, it may be one or several pulses being uploaded at a time depending on the optical design. In other words, the quantum gate to perform a correction is selected, but that gate is ultimately implemented via a pulse. It has the disadvantage of requiring a synchronous upload of a program that is exponentially larger than the program that is actually executed (since it includes all possible branches throughout the circuit).

Precompiled branching has much higher memory costs than a streaming architecture. Additionally, there is classical overhead to prepare all gates in the circuit ahead of time, and this scales with the number of gates and branches. The benefit of streaming is that these decisions are no longer a fixed pre-circuit classical overhead, as the system keeps up with the quantum program compilation as the quantum program executes on trapped ions.

Figure 8:
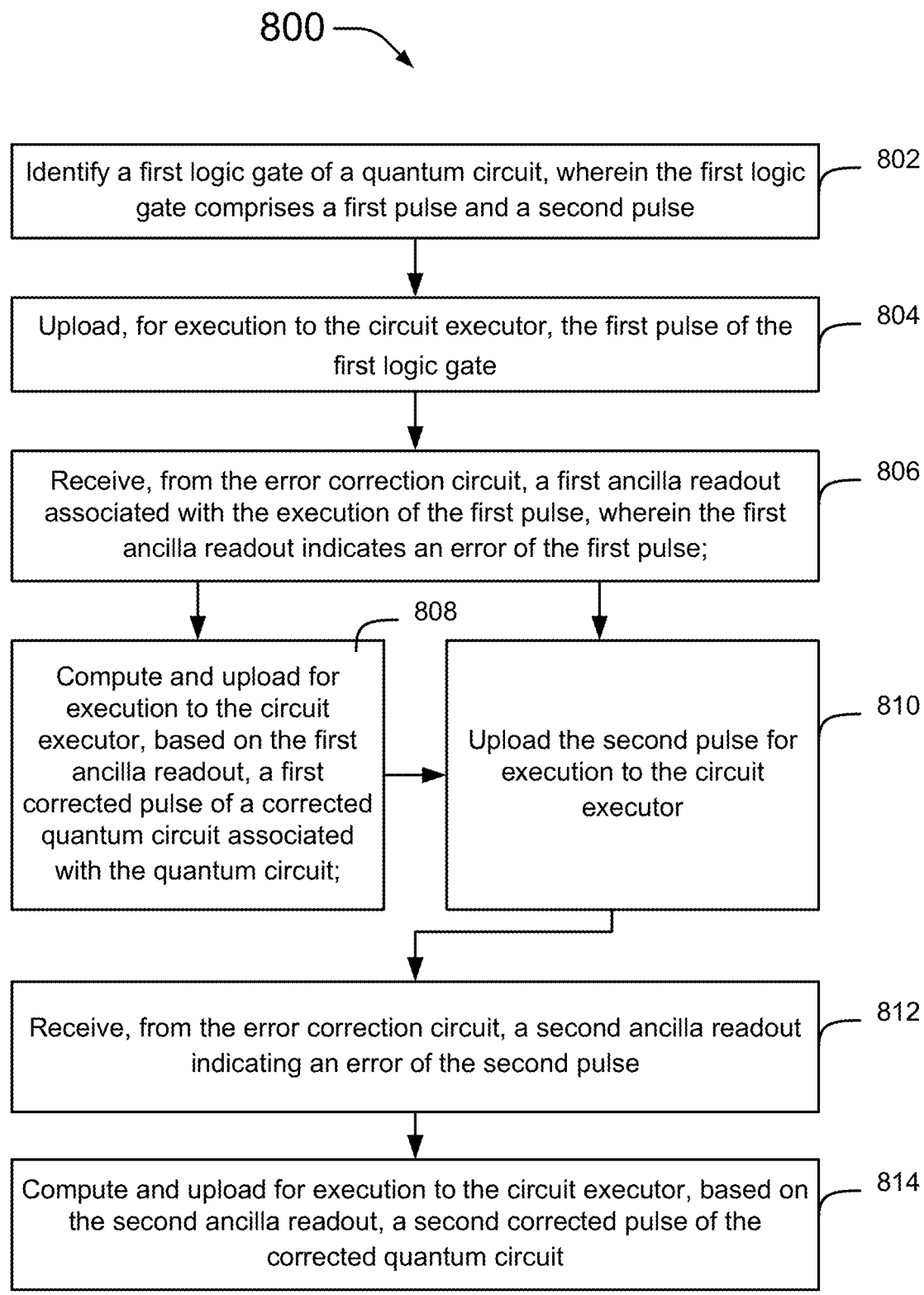
FIG. 8 illustrates an exemplary method for streaming gates in accordance with aspects of this disclosure.

FIG. 8 illustrates an exemplary method 800 for streaming gates in accordance with aspects of this disclosure. At 802, classical control processor 402 identifies a first logic gate of a quantum circuit, wherein the first logic gate comprises a first pulse and a second pulse. At 804, classical control processor 402 uploads, for execution to the circuit executor, the first pulse of the first logic gate.

At 806, classical control processor 402 receives, from the error correction circuit, a first ancilla readout associated with the execution of the first pulse, wherein the first ancilla readout indicates an error of the first pulse.

At 808, classical control processor 402 computes and uploads for execution to the circuit executor, based on the first ancilla readout, a first corrected pulse of a corrected quantum circuit associated with the quantum circuit.

At 810, concurrent to computing and uploading the first corrected pulse, classical control processor 402 uploads the second pulse for execution to the circuit executor.

At 812, classical control processor 402 receives, from the error correction circuit, a second ancilla readout indicating an error of the second pulse.

At 814, classical control processor 402 computes and uploads for execution to the circuit executor, based on the second ancilla readout, a second corrected pulse of the corrected quantum circuit.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

The invention claimed is:

1. A quantum information processing (QIP) system comprising:
   a circuit executor configured to execute pulses that represent quantum gates or quantum circuits;
   an error correction circuit that outputs ancilla readouts of executed pulses; and
   a classical control processor configured to:
      identify a first logic gate of a quantum circuit, wherein the first logic gate comprises a first pulse and a second pulse;
      upload, for execution to the circuit executor, the first pulse of the first logic gate;
      receive, from the error correction circuit, a first ancilla readout associated with the execution of the first pulse, wherein the first ancilla readout indicates an error of the first pulse;
      compute and upload for execution to the circuit executor, based on the first ancilla readout, a first corrected pulse of a corrected quantum circuit associated with the quantum circuit;
      concurrent to computing and uploading the first corrected pulse, upload the second pulse for execution to the circuit executor;
      receive, from the error correction circuit, a second ancilla readout indicating an error of the second pulse; and
      compute and upload for execution to the circuit executor, based on the second ancilla readout, a second corrected pulse of the corrected quantum circuit.

2. The QIP system of claim 1, wherein the first pulse comprises a sequence of pulses.

3. The QIP system of claim 1, wherein the first corrected pulse is an additional pulse different from the first pulse.

4. The QIP system of claim 1, wherein the classical control processor is further configured to:
identify a second logic gate of the quantum circuit, wherein the second logic gate comprises a third pulse and a fourth pulse;
upload, for execution to the circuit executor, the third pulse of the second logic gate;
receive, from the error correction circuit, a third ancilla readout associated with the execution of the third pulse, wherein the third ancilla readout indicates an error of the third pulse;
compute and upload for execution to the circuit executor, based on the third ancilla readout, a third corrected pulse of the corrected quantum circuit;
concurrent to computing and uploading the third corrected pulse, upload the fourth pulse for execution to the circuit executor;
receive, from the error correction circuit, a fourth ancilla readout indicating an error of the fourth pulse; and
compute and upload for execution, based on the fourth ancilla readout, a fourth corrected pulse of the corrected quantum circuit.

5. The QIP system of claim 4, wherein the classical control processor is configured to concurrently upload both the first pulse and the third pulse for execution.

6. The QIP system of claim 4, wherein the classical control processor is configured to concurrently upload both the third pulse and the first corrected pulse for execution.

7. The QIP system of claim 1, wherein the classical control processor is configured to identify the first logical gate of the quantum circuit for execution before other logical gates of the quantum circuit in response to determining that an output of the first logical gate is used by the other logical gates.

8. The QIP system of claim 1, wherein the classical control processor is configured to identify the first logical gate of the quantum circuit for execution before other logical gates of the quantum circuit in response to determining that outputs of the other logical gates are not used by the first logical gate.

9. A quantum information processing (QIP) system comprising:
a circuit executor configured to execute pulses that represent quantum gates or quantum circuits;
an error correction circuit that outputs ancilla readouts of executed pulses; and
a classical control processor configured to:
generate and upload to the circuit executor a plurality of precompiled quantum circuit branches, wherein each branch of the plurality of precompiled quantum circuit branches represents a variation of a quantum circuit;
select a first branch of the plurality of precompiled quantum circuit branches to execute;
receive, from the error correction circuit, a first ancilla readout associated with the execution of a first pulse of the first branch, wherein the first ancilla readout indicates an error of the first pulse;
select a second branch of the plurality of precompiled quantum circuit to execute based on the first ancilla readout;
receive, from the error correction circuit, a second ancilla readout associated with the execution of a second pulse of the second branch, wherein the second ancilla readout indicates an error of the second pulse; and
select a third branch of the plurality of precompiled quantum circuit to execute based on the second ancilla readout.

10. A method for streaming gates, comprising:
identifying a first logic gate of a quantum circuit, wherein the first logic gate comprises a first pulse and a second pulse;
uploading, for execution to a circuit executor, the first pulse of the first logic gate, wherein the circuit executor is configured to execute pulses that represent quantum gates or quantum circuits;
receiving, from an error correction circuit, a first ancilla readout associated with the execution of the first pulse, wherein the first ancilla readout indicates an error of the first pulse;
computing and uploading for execution to the circuit executor, based on the first ancilla readout, a first corrected pulse of a corrected quantum circuit associated with the quantum circuit;
concurrent to computing and uploading the first corrected pulse, uploading the second pulse for execution to the circuit executor;
receiving, from the error correction circuit, a second ancilla readout indicating an error of the second pulse; and
computing and uploading for execution to the circuit executor, based on the second ancilla readout, a second corrected pulse of the corrected quantum circuit.

11. The method of claim 10, wherein the first pulse comprises a sequence of pulses.

12. The method of claim 10, wherein the first corrected pulse is an additional pulse different from the first pulse.

13. The method of claim 10, further comprising:
identifying a second logic gate of the quantum circuit, wherein the second logic gate comprises a third pulse and a fourth pulse;
uploading, for execution to the circuit executor, the third pulse of the second logic gate;
receiving, from the error correction circuit, a third ancilla readout associated with the execution of the third pulse, wherein the third ancilla readout indicates an error of the third pulse;
computing and uploading for execution to the circuit executor, based on the third ancilla readout, a third corrected pulse of the corrected quantum circuit;
concurrent to computing and uploading the third corrected pulse, uploading the fourth pulse for execution to the circuit executor;
receiving, from the error correction circuit, a fourth ancilla readout indicating an error of the fourth pulse; and
computing and uploading for execution, based on the fourth ancilla readout, a fourth corrected pulse of the corrected quantum circuit.

14. The method of claim 13, further comprising concurrently uploading both the first pulse and the third pulse for execution.

15. The method of claim 13, further comprising concurrently uploading both the third pulse and the first corrected pulse for execution.

16. The method of claim 10, further comprising identifying the first logical gate of the quantum circuit for execution before other logical gates of the quantum circuit in response to determining that an output of the first logical gate is used by the other logical gates.

17. The method of claim 10, further comprising identifying the first logical gate of the quantum circuit for execution before other logical gates of the quantum circuit in response to determining that outputs of the other logical gates are not used by the first logical gate.

18. A quantum information processing (QIP) system comprising:
- a circuit executor configured to execute pulses that represent quantum gates or quantum circuits;
- an error correction circuit that outputs ancilla readouts of executed pulses;
- a classical control processor configured to:
    - generate and upload to the circuit executor a plurality of precompiled quantum circuit branches, wherein each branch of the plurality of precompiled quantum circuit branches represents a variation of a quantum circuit;
    - select a first branch of the plurality of precompiled quantum circuit branches to execute;
    - receive, from the error correction circuit, a first ancilla readout associated with the execution of a first pulse of the first branch, wherein the first ancilla readout indicates an error of the first pulse;
    - select a second branch of the plurality of precompiled quantum circuit to execute based on the first ancilla readout;
    - receive, from the error correction circuit, a second ancilla readout associated with the execution of a second pulse of the second branch, wherein the second ancilla readout indicates an error of the second pulse; and
- select a third branch of the plurality of precompiled quantum circuit to execute based on the second ancilla readout.

* * * * *